(12) United States Patent
Cavallaro et al.

(10) Patent No.: US 11,168,035 B2
(45) Date of Patent: Nov. 9, 2021

(54) AQUEOUS SUSPENSION FOR AGRONOMIC USE

(71) Applicant: SCL ITALIA S.P.A., Milan (IT)

(72) Inventors: Lorenzo Cavallaro, Milan (IT); Sandro Gualerci, Milan (IT); Paolo Bonini, Milan (IT)

(73) Assignee: SCL ITALIA S.P.A., Milan (IT)

( * ) Notice: Subject to any disclaimer, the term of this patent is extended or adjusted under 35 U.S.C. 154(b) by 56 days.

(21) Appl. No.: 16/465,873

(22) PCT Filed: Dec. 4, 2017

(86) PCT No.: PCT/IB2017/057605
§ 371 (c)(1),
(2) Date: May 31, 2019

(87) PCT Pub. No.: WO2018/104840
PCT Pub. Date: Jun. 14, 2018

(65) Prior Publication Data
US 2020/0024206 A1   Jan. 23, 2020

(30) Foreign Application Priority Data

Dec. 5, 2016  (IT) .......................... 102016000123345
Dec. 14, 2016 (IT) .......................... 102016000126419

(51) Int. Cl.
*C05D 9/02* (2006.01)
*A01N 25/04* (2006.01)

(52) U.S. Cl.
CPC ............... *C05D 9/02* (2013.01); *A01N 25/04* (2013.01)

(58) Field of Classification Search
None
See application file for complete search history.

(56) References Cited

U.S. PATENT DOCUMENTS

| 7,695,541 | B1 | 4/2010 | Frizzell et al. |
| 2010/0154498 | A1 | 6/2010 | Valencia |

FOREIGN PATENT DOCUMENTS

| EP | 1 464 635 A1 | 10/2004 |
| GB | 1 500 441 | 2/1978 |
| KR | 10-2004-0066958 A | 7/2004 |

OTHER PUBLICATIONS

International Search Report, issued in PCT/IB2017/057605, dated Mar. 8, 2018.
Written Opinion of the International Searching Authority, issued in PCT/IB2017/057605, dated Mar. 8, 2018.

*Primary Examiner* — Alton N Pryor
(74) *Attorney, Agent, or Firm* — Birch, Stewart, Kolasch & Birch, LLP (57) ABSTRACT

An aqueous suspension includes, in weight percent with respect to the total weight of the suspension, at least 10% of at least one metal in the form of salt and/or oxide and/or hydroxide, at least 3.5% of at least one polyphenol and from 0.05 to 10% of at least one dispersing agent. A process for the production of an aqueous suspension includes, in weight percent with respect to the total weight of the suspension, at least 10% of at least one metal in the form of salt and/or oxide and/or hydroxide, at least 3.5% of at least one polyphenol and from 0.05 to 10% of at least one dispersing agent, which includes a mixing step of the at least one metal, the at least one polyphenol, the at least one dispersing agent, and any other further components in water. The aqueous suspension can be used as fertilizer and/or phytoprotective agent of a plant by application of the aqueous suspension of the invention to the plant.

21 Claims, 5 Drawing Sheets

AQUEOUS SUSPENSION FOR AGRONOMIC USE

FIELD OF APPLICATION

The present invention relates in general to the field of the agricultural industry.

In particular, the invention relates to a suspension with a fertilizing and phytoprotective activity, a process for its production and use thereof.

PRIOR ART

Plants, from both conventional and hydroponic cultivations, require some essential minerals, including the macronutrients nitrogen, phosphorous, potassium, calcium, magnesium and sulphur; and the micronutrients iron, manganese, boron, molybdenum, copper, zinc, chlorine, and cobalt. When present in the soil, the plant absorbs these minerals through the roots. The same minerals, and possibly others, can also be administered through fertilizers, to be applied either in the soil (so that the minerals enter the systemic flow of the plant), or directly on the plant, usually on the leaves by spraying. Depending on the characteristics of the soil, it may be necessary to apply a fertilizer that is to a higher or lower extent nutritionally complete, and therefore there is a variety of options available on the market that comprises fertilizers containing all the micro- and macro-nutrients the plant needs for growing, as well as the more targeted mono-nutrient fertilisers.

The efficacy of a fertilizer is influenced by the characteristics of the soil, for example its pH, its structure, and by the absorption characteristics of the roots and leaves of the plants. An important factor determining the availability of a mineral is its hydrosolubility, as well as its chemical form. By way of example, ferrous sulphate is not particularly suitable for use in soils that contain calcium hydroxide or other alkaline materials as the latter convert the ferrous sulphate to magnetite ($Fe_3O_4$) or hematite ($Fe_2O_3$).

A nutrient is said to be available when it is suitable for being absorbed directly by the plant without there being any need, for example, for it to be digested by a microorganism or for it to be subjected to any degradation process.

U.S. Pat. No. 4,116,663 describes a growth medium for plants which comprises an iron chelate and a tannin obtained by reaction of the iron with a tannin in an aqueous solution in a ratio between tannin and iron ranging from 2:1 to 11:1. The chelate thus formed can be easily assimilated by the plants through the soil.

It is also known that some micronutrients that are essential for the nutrition of plants also have a phytoprotective action.

For decades, for example, copper has been known for its fungicidal action. It has a wide range of action against numerous fungal infections (such as those pertaining to *Peronosporales*) affecting olive trees, vines, pomes and citrus fruits.

It is normally applied in the form of "Bordeaux mixture", copper oxychlorides, etc. by spraying the leaves of the plant in question.

As fertilizers, as well as plant protection products, must be accurately dosed, diluted and then distributed on the plants or in the soil as uniformly as possible, it is normally preferable for them to be supplied to the operator in a concentrated, easily pumpable, liquid form, that does not release powders into the environment, and which can be easily diluted in water. Another factor which thus has a decisive influence on the performances of a fertilizer is its homogeneity of composition, that allows an accurate dosage, that can be repeated over time without undesired variations in concentration.

Considering the growing awareness of the public with respect to environmental protection, there is an increasing demand for a fertilizer to have the lowest possible environmental impact, in other words a low phytotoxicity.

Finally, another desired feature in a fertilizer is its high concentration in nutrients. A concentration of nutrients which is too low, in fact, requires having to repeat the application of the fertilizer several times, and having to transport larger quantities of product, with a consequent waste of resources and time.

It is not always possible, however, to satisfy all these requirements with a particular fertilizing product. A high concentration of a nutrient, for example a micronutrient, may result in poor solubility and therefore its precipitation from the solution (and consequently its lack of availability). The use of specific solvents for overcoming this problem, on the other hand, can create problems of over-exposure due to their toxicity, for both the plants and the operators.

Fertilizers in the form of powder or granules, to be dissolved in water upon use, are also known. These fertilizers, however, can suffer from the drawback of requiring a long time for their dissolution as they are strongly influenced by the temperature of the water, with a consequent delay in application. Furthermore, the solution obtained, even when temporarily homogeneous, does not always maintain this characteristic over time so that it cannot be used at a later time, thus generating product waste, which causes a loss in resources and which must in any case be disposed of.

Finally, this type of dry product is likely to absorb atmospheric humidity during storage, thus causing alterations in its behaviour and undesired variations in its dosage.

The need is therefore felt for providing a fertilizer that is easy and convenient to use, which overcomes the above-mentioned drawbacks of the fertilizers of the prior art.

The technical problem underlying the present invention is therefore to provide a fertilizer in liquid form and easily pumpable, with a higher concentration of nutrients, in particular micronutrients, compared to the fertilizers of the prior art.

A further technical problem underlying the present invention is to provide such a fertilizer which includes micronutrients that are more available for absorption by plants compared to fertilizers of the prior art.

Another technical problem underlying the present invention is to provide such a fertilizer which is homogeneous and stable over time, in particular for at least 6 months, more preferably up to 24 months.

Yet another technical problem underlying the present invention is to provide such a fertilizer which has a marked biostimulating activity for a faster absorption of micronutrients.

A further technical problem underlying the present invention is to provide such a fertilizer which has a lower phytotoxicity impact compared to fertilizers of the prior art, or no phytotoxicity impact.

Another technical problem underlying the present invention is to provide such a fertilizer which is easier and more convenient to use compared to fertilizers of the prior art.

Yet another technical problem underlying the present invention is to provide such a fertilizer which has a phytoprotective activity, in particular a fungicidal and nematostatic activity.

SUMMARY OF THE INVENTION

This problem has been solved according to the invention by an aqueous suspension comprising, in weight percent with respect to the total weight of the suspension, at least 10% of at least one metal in the form of salt and/or oxide and/or hydroxide, at least 3.5% of at least one polyphenol and from 0.05 to 10% of at least one dispersing agent.

The concentration of the at least one metal in the form of salt and/or oxide and/or hydroxide is to be understood as being expressed as the weight of the metal with respect to the total weight of the suspension.

Preferably, the at least one metal is a plant macronutrient and/or micronutrient.

Preferably, the plant macronutrient is a metal chosen from potassium, calcium, magnesium, and mixtures thereof.

Preferably, the plant micronutrient is a metal chosen from iron, manganese, sodium, zinc, copper, nickel, cobalt, molybdenum and mixtures thereof.

The at least one metal is preferably chosen from copper, zinc, manganese, cobalt, iron and molybdenum, more preferably from copper, zinc and manganese, even more preferably from zinc and copper, most preferably copper.

The salt is preferably chosen from carbonate, nitrate, chloride and sulphate, more preferably carbonate.

In a preferred embodiment, the metal is in the form of a salt.

In an alternative preferred embodiment, the metal is in the form of a mixture of salt and hydroxide.

The at least one metal is preferably in the form of a mixture of copper carbonate and copper hydroxide (alkaline copper carbonate).

In a further alternative preferred embodiment, the metal is in the form of oxide.

Preferably, the at least one metal is in the form of copper oxide.

In a further alternative preferred embodiment, the metal is in the form of a mixture of salt and oxide.

Preferably, the at least one metal is in the form of a mixture of copper carbonate and copper oxide.

The at least one polyphenol is preferably chosen from flavones, tannins, lignin and anthocyanins, preferably tannins.

Tannin is a polyphenol compound of a plant origin, found in high amounts in the bark of plants such as oak, chestnut, fir and acacia, as well as in the grape skins, grape seeds and grape stems.

Preferably, the at least one metal is present in the suspension, in weight percent with respect to the total weight of the suspension, in a concentration ranging from 10 to 60%, more preferably from 10 to 40%, even more preferably from 15 to 35%, most preferably from 18 to 25%.

Preferably, when the at least one metal is zinc, the zinc is present in the suspension in a concentration, in weight percent with respect to the total weight of the suspension, ranging from 10 to 35%, more preferably from 10 to 25% even more preferably from 10 to 22%, most preferably from 15 to 20%.

Preferably, when the at least one metal is in the form of oxide, the metal is present in the suspension in a concentration, in weight percent with respect to the total weight of the suspension, ranging from 35 to 60%, more preferably from 40 to 60% even more preferably from 45 to 60%.

The at least one polyphenol is preferably present in the suspension, in weight percent with respect to the total weight of the suspension, in a concentration ranging from 5 to 20%, more preferably from 5 to 15%, even more preferably from 6 to 12%, most preferably from 8 to 10%.

The at least one metal and the at least one polyphenol are present in the suspension in a weight ratio ranging from 0.6 to 9.5, more preferably from 1 to 7.0, even more preferably from 1.5 to 4.5.

In a preferred embodiment, the at least one metal and the at least one polyphenol are present in the suspension in a weight ratio ranging from 0.5 to 12, more preferably from 0.6 to 8.0, even more preferably from 1.3 and 6, most preferably from 1.8 to 3.5.

Preferably, substantially all said at least one polyphenol, preferably tannin, is in the complexed form with the at least one metal.

Without wishing to be bound by theory, the Applicant believes that mechanism of interaction between the polyphenol and the metal consists in the formation of a particular complex in which the hydroxylic groups (—OH) of the polyphenol are surrounded by the metal so as to prevent the formation of bridging ligands between several polyphenol molecules. Microparticles are thus formed, that can comprise one or more polyphenol molecules and that are, by virtue of this interaction, insoluble and suspendable. It cannot be excluded however, that a small quantity of soluble complexes can also form. Moreover, it cannot be excluded that the suspension comprises a small quantity of polyphenols and metals in the soluble form that are not complexed with each other.

Preferably, the content of polyphenols in soluble form, in weight percent with respect to the total weight of the suspension, is 1% or lower.

The contents of polyphenols and metals can be determined according to methods known in the field.

For example, the content of polyphenols in the suspension can be determined by way of the Folin-Ciocâlteu method (Singleton V. L. & Rossi A. (1965) Colorimetry of total phenolics with phospitomolybolic-phosphotungstic acid reagents, *American Journal of Enology and Viticulture*, 16, 144-158). The content of polyphenols in soluble form in the suspension can be determined by filtering an aqueous extract of the suspension, for example through a 0.45 μm pore size nylon filter paper (Whatman, Merck, Germany), and determining the polyphenol content of the filtrate by way of the Folin-Ciocâlteu method.

The metal content can be determined by way of the method REG CE 2003/2003, Annex IV, points 9 and 10, in particular points 9.1 and 10.1.

In place of the spectrophotometric analyses, the determination of the metal content can be carried out by way of analysis by inductively coupled plasma atomic emission spectroscopy (ICP-OES) according to the method described in APAT CNR IRSA 3020 Man 29 2003.

The expression "dispersing agent" refers to a compound that has the action of keeping the metal in suspension, in particular when it is not complexed (for example with a polyphenol).

The at least one dispersing agent is preferably chosen from acrylic polymers, phosphatides, phosphoric esters and alkyl sulphonates.

The acrylic polymer is preferably sodium polyacrylate.

The phosphatide is preferably soy lecithin.

When the at least one metal is zinc, the dispersing agent is preferably soy lecithin.

When the at least one metal is copper or manganese, the dispersing agent is preferably sodium polyacrylate.

The at least one dispersing agent is preferably present in the suspension in a concentration, in weight percent with respect to the total weight of the suspension, ranging from 0.1 to 5%, more preferably from 0.5 to 2%.

The aqueous suspension preferably comprises at least one thickener.

The at least one thickener is preferably a polymer, more preferably chosen from carboxymethylcellulose, xanthan gum, guar gum, agar agar, acrylic copolymers, alginates, natural gum, polyphosphates, even more preferably carboxymethylcellulose and/or xanthan gum.

The at least one thickener is preferably present in the suspension, in a concentration, in weight percent with respect to the total weight of the suspension, ranging from 0.01 to 2%, more preferably from 0.03 to 1%, even more preferably from 0.05 to 0.5%.

The suspension preferably comprises at least one anti-foaming agent, more preferably chosen from silicones and polymer emulsions, even more preferably monoethane ethoxylate.

The expression "anti-foaming agent" refers here to a compound which lowers the surface tension of the suspension.

The at least one anti-foaming agent is preferably present in the suspension in a concentration, in weight percent with respect to the total weight of the suspension, ranging from 0.005 to 0.05%, more preferably from 0.008 to 0.012%.

When the at least one metal is copper, the suspension preferably comprises monoethanolamine and/or ammonia, more preferably monoethanolamine.

The monoethanolamine, when present, is preferably present in a concentration, in weight percent with respect to the total weight of the suspension, ranging from 4 to 13%, more preferably from 10 to 12%.

The suspension preferably comprises urea.

The suspension preferably comprises a concentration of ureic nitrogen (N), in weight percent with respect to the total weight of the suspension, ranging from 0.5 to 5.0%, more preferably from 0.7 to 4.0%.

The at least one metal, the at least one polyphenol and/or any one or more further solid components preferably have an average particle diameter of 20 μm or less, more preferably ranging from 0.1 to 15 μm.

The average particle diameter is expressed in terms of equivalent spherical diameter (diameter of a spherical particle having an equivalent volume) measured by means of laser diffraction, for example using the instrument Laser Sympatec Helos, with Rodos and Quixel dispersion systems, using the Mie theory as optical model (ISO 13320-1).

The suspension preferably has a pH ranging from 5.0 to 10.0, more preferably ranging from 8.0 to 9.5.

The suspension preferably has a thixotropic behaviour. The suspension is preferably pumpable and pourable.

The suspension preferably has a viscosity at 20° C. ranging from 300 to 15,000 cP, more preferably from 500 to 12,000 cP, even more preferably from 800 to 8,000 cP, most preferably from 1,000 to 4,000 cP.

The viscosity is measured in cP using a Brookfield instrument with a spindle nr.63, a speed of 60 rpm, with a torque ranging from 10 to 100% at a temperature of 20° C. It is within the capability of skilled person in the field to adopt an appropriate number of revs, in order to meet the specified torque range.

The suspension preferably has a specific weight ranging from 1.0 to 2.5 kg/dm$^3$ (=9,800 and 24,500 N/m$^3$), more preferably from 1.2 to 2.3 kg/dm$^3$ (=11,800 and 22,500 N/m$^3$) even more preferably ranging from 1.3 to 2.2 kg/dm$^3$ (=12,800 and 21,500 N/m$^3$).

The suspension preferably has a shelf-life of at least 6 months, more preferably at least 12 months, even more preferably at least 18 months, most preferably at least 24 months at a temperature ranging from 4° to 35° C.

The present invention also relates to a process for the production of an aqueous suspension comprising, in weight percent with respect to the total weight of the suspension, at least 10% of at least one metal in the form of salt and/or oxide and/or hydroxide, at least 3.5% of at least one polyphenol and from 0.05 to 10% of at least one dispersing agent, which comprises a step for mixing the at least one metal, the at least one polyphenol, the at least one dispersing agent, and any further components in water.

The mixing step is preferably carried out at a temperature ranging from 20 to 60° C., more preferably from 30 to 40° C.

In the mixing step, the at least one metal, the at least one polyphenol, the at least one dispersing agent and any possible further components, are preferably mixed in sequence.

The mixing step preferably has a duration ranging from 0.5 to 5 hours, more preferably from 1 to 4 hours, even more preferably from 1.5 to 3 hours.

The mixing step is preferably carried out in one or more of a mixer, a homogenizer and a wet mill.

The mixing step is preferably preceded by a step of reduction of the particle size distribution of the at least one metal, the at least one polyphenol, and/or any solid components among the further components of the suspension.

The step of reduction of the particle size distribution is preferably a micronization step.

When the mixing step is carried out in a wet mill, the reduction step of the particle size distribution is advantageously carried out together with the mixing step.

The present invention also relates to a process for the fertilizing and/or phytoprotective treatment of a plant which comprises a step for applying the fertilizing suspension of the invention to the plant.

The present invention further relates to the use of the aqueous suspension of the present invention as fertilizer and/or phytoprotective agent of a plant by the application to the plant of the aqueous suspension of the invention.

The expression "phytoprotective treatment" refers herein to a treatment for preventing and/or combating an infestation by one or more among fungi, bacteria, nematodes, parasites and other pathogens.

The term "phytoprotective" refers herein to the ability to prevent and/or combat an infestation by fungi, bacteria, nematodes, parasites, slugs and/or other parasites or pathogens.

The application of the aqueous suspension of the invention to the plant is preferably carried out directly on the plant, preferably on the leaves of the plant and/or in the soil surrounding the plant, even more preferably by spraying.

The spray application is preferably carried out with a nebulizer and/or sprayer.

The application on the leaves of the plant by spraying is preferably effected by wetting the leaves of the plants to be treated until they are dripping.

The application of the aqueous suspension of the invention is preferably preceded by a dilution step of the aqueous suspension of the invention thus obtaining a suspension having a concentration of the at least one metal, in weight percent with respect to the total volume of the suspension, ranging from 0.02 to 0.3%, more preferably ranging from 0.04% to 0.2%.

The process for the treatment, or use as fertilizer and/or phytoprotective agent of a plant preferably comprises the 
application of a quantity of suspension, in dry weight per hectare of field, ranging from 50 to 2,250 g/ha, more preferably from 75 to 2,000 g/ha, even more preferably from 80 to 1,900 g/ha.

The application of the suspension is preferably repeated with a frequency ranging from 1 to 4 weeks for a total number of applications ranging from 1 to 8.

The plant is preferably chosen from the families of Fabaceae, Rosaceae, Musaceae, Poaceae, Solanaceae, Ericaceae, Brassicaceae, Cucurbitaceae, Apiaceae, Sterculiaceae, Arecaceae, Rubiaceae, Malvaceae, Rutaceae, Amaryllidaceae, Asteraceae, Anacardiaceae, Oleaceae, Vitaceae, Bromeliaceae, Amaranthaceae, more preferably Fabaceae, Solanaceae and Vitaceae.

The plant of the Solanaceae family is preferably chosen from *Solanum tubersum* (potato), *Capiscuum annuum* (pepper and chili pepper), *Nicotina tobaccum* (tobacco), *Solanum lycopersicum* (tomato), *Solanum lycopersicum esculentum* (tomato), *Solanum melongena* (aubergine), more preferably *Capiscuum annuum* (pepper and chili pepper) and *Solanum tubersum* (potato).

The plant of the Poaceae family is preferably chosen from *Oryza sativa* (rice), *Hodeum vulgare* (barley), *Zea mays* (corn), and *Triticum aestivum* (wheat), more preferably *Oryza sativa* (rice).

The plant of the Fabaceae family is preferably chosen from *Glycine max* (soya), *Madicago sativa* (alfa-alfa), *Cicer aretinum* (chickpea), *Phasoleus vulgaris* (sugar snap pea), *Macrotyloma uniflorum* (madras bean), *Lens culinariae* (lentil), *Vigna radiata* (mung bean), *Pisium sativum* (pea), and *Arachis Hypogaea* (peanut), more preferably *Arachis Hypogaea* (peanut), *Phasoleus vulgaris* (sugar snap pea), and *Glycine max* (soya).

The plant of the Vitaceae family is preferably *Vitis* sp. (vine), more preferably *Vitis vinifera* (grape).

The plant of the Cucurbitaceae family is preferably chosen from *Citrullus lanatus* (watermelon), *Cucumis* apple (melon), and *Cucumis sativas* (cucumber).

The plant of the Rosaceae family is preferably chosen from *Prunus* spp., more preferably *Prunus dulci* (almond), *Prunus armeniaca* (apricot), *Prunus persica* (peach and nectarine), *Prunus prunus* (plum) and *Prunus avium* (cherry).

The plant of the Musaceae family is preferably chosen from *Musa acuminata* (banana), *Musa balbisiana* (banana), and *Musa paradisa* (banana).

The plant of the Ericaceae family is preferably chosen from *Vaccinium cyanococcus* (blueberry) and *Vaccinium ocycoccus* (cranberry).

The plant of the Apiaceae family is preferably *Daucas carota* (carrot).

The plant of the Brassicaceae family is preferably chosen from *Brassica oleracea* (cabbage) and *Brassica napus* (rapeseed), more preferably *Brassica napus* (rapeseed)

The plant of the Sterculiaceae family is preferably *Theobroma cacao* (cocoa).

The plant of the Arecaceae family is preferably chosen from *Cocos nucifera* (coconut), *Elais guineensis* (palm oil) and *Phoenyx Dactylifera* (date), more preferably *Elais guineensis* (palm oil).

The plant of the Rubiaceae family is preferably chosen from *Coffeae* (coffee), more preferably *Arab Coffea* (Arabic Coffee) or *Coffea Robusta* (Robust Coffee).

The plant of the Malvaceae family is preferably *Gossypium herbaceum* (cotton).

The plant of the Rutaceae family is preferably chosen from *Citrus paradisi* (grapefruit), *Citrus limonium* (lemon), *Citrus latifolia* (lime), *Citrus reticulata* (tangerine), *Citrus aurantium* (orange), and *Citrus nobilis* (tangerine).

The plant of the Amaryllidaceae family is preferably chosen from *Allium porum* (leek) and *Allium cepa* (onion), more preferably *Allium cepa* (onion).

The plant of the Asteraceae family is preferably chosen from *Lactuca sativa* (lettuce) and *Hellianthus annuus* (sunflower).

The plant of the Anacardiaceae family is preferably *Mangifera indica* (mango).

The plant of the Oleaceae family is preferably *Olea europea* (olives).

The plant of the Bromeliaceae family is preferably *Ananas comosus* (pineapple).

The plant of the Amaranthaceae family is preferably *Saccharum officinarum* (sugar cane).

The plant is preferably chosen from the group comprising soya (*Glycine max L. Merrill*), vine (*Vitis vinifera*) and potato (*Solanum tubersum*), more preferably soya (*Glycine max L. Merrill*) and/or vine (*Vitis vinifera*).

The at least one metal of the suspension is preferably chosen from copper and zinc and mixtures thereof, even more preferably copper.

The treatment or use as phytoprotective agent is preferably a treatment or use as fungicide, bacteriostatic agent, insecticide, nematostatic agent and/or slug killer.

The treatment or use as fungicide is preferably a treatment or use for preventing and/or combating infestation from fungi.

The fungi are preferably one or more chosen from the species *Acrosporium* (for example *A. tingitaninum*), *Albugo* (for example *A. candida*), *Alternaria, Aphanomyces* (for example *A. euteiches*), *Armillaria, Ascochyta, Aspergillus, Asperisporium* (for example *A. caricae*), *Asteridiella* (for example *A. perseae*), *Athelia* (for example *A. rolfsii*), *Bionectra* (for example *B. ochroleuca*), *Blumeria* (for example *B. graminis*), *Blumeriella* (for example *B. jaapii*), *Botrytis, Botryosphaeria, Botryotinia* (for example *B. fuckeliana*), *Brasiliomyces* (for example *B. malachrae*), *Bremia* (for example *B. lactucae*), *Calonectria* (for example *C. ilicicola* and *C. kyotensis*), *Ceratocystis, Cercospora, Cladosporium, Clavibacter* (for example *C. michiganensis*), *Claviceps* (for example *C. purpurea*), *Cochliobolus, Colletotrichium, Cordana* (for example *C. musae*), *Curvularia, Cycloconium* (for example *C. oleaginum*), *Cylindrocladium, Dickeya* (for example *D. solani*), *Didymella, Diplodia* (for example *D. gossypina*), *Echinocloa* ("ragged stunt virus"), *Elsinoe* (for example *E. ampelina*), *Erysiphe, Eutypa* (for example *E. lata*), *Fusarium, Ganoderma, Gibberella, Glomerella, Graphium, Guignardia* (for example *G. bidwellii* and *G. citricarpa*), *Helminthosporium, Hemileia* (for example *H. coffeicola* and *H. vastatrix*), *Hyaloperonospora* (for example *H. brassicae*), *Khuskia* (for example *K. Oryzae*), *Lasodiplodia* (for example *L. theobromae*), *Leptoshaeria* (for example *L. coniothyrium* and *L. maculans*), *Leveillula* (for example *L. leguminosarum*, in particular f. *lentis*, and *L. taurica*), *Macrophomina* (for example *M. phaseolina*), *Magnaporthe* (for example *M. oryzae*), *Meliola* (for example *M. mangifera*), *Microdochium* (for example *M. oryzae*), *Monilinia, Mycocentrospora* (for example *M. acerina*), *Mycoleptodiscus* (for example *M. terrestris*), *Mycosphaerella, Mycovellosiella* (for example *M. concors*), *Oidium, Oidiopsis* (for example *O. gossypii*), *Peronosclerospora, Peronospora, Phaemoniella* (for example *P. aleophilum* and *P. chlamydospora*), *Phakospora, Phoma, Phomopsis, Phyllosticta, Phymatotrichopsis* (for example *P. omnivora*), *Phytophthora, Plasmodiophora* (for example *P. brassicae*), *Plas-* mopara, *Pleospora* (for example *P. tarda*), *Podosphaera* (for example *P. clandestina* and *P. leucotricha*), *Pseudocercospora*, *Puccinia*, *Pyrenopeziza* (for example *P. brassicae*, more specifically *cylindrosporium*), *Phytium*, *Ramularia* (for example *R. beticula*), *Rhizoctonia*, *Rhizomania*, *Rhizopus*, *Rhynchosporium* (for example *R. secalis*), *Rosellinia* (for example *R. bunodes* and *R. pepo*), *Sarocladium* (for example *S. oryzae*), *Sclerophthora* (for example. *S. macrospora* and *S. rayssiae*), *Sclerospora* (for example *S. graminicola*), *Sclerotinia*, *Sclerotium*, *Sclerotorium* (for example *S. cinnamomi*, *S. rolfsii* and *S. cepivorum*), *Septoria*, *Septoria*, *Sphacelia*, *Sphaceloma* (for example *S. persae*), *Sphacelotheca*, *Sphaerulina* (for example *S. oryzina*), *Tapesia* (for example *T. yallundae*), *Thielaviopsis* (for example *T. basicola*), *Tilletia* (for example *T. caries*), *Tranzschelia* (for example *T. discolor*), *Trichoconiella* (for example *T. padwickii*), *Trichothecium* (for example *T. roseum*), *Uncinula* (for example *U. necator*), *Uromyces*, *Ustilaginoidea* (for example *U. virens*), *Ustilago* (for example *U. zeae-maydis*), *Venturia* (for example *V. carpophilia* and *V. inequalis*) and *Verticillium*, more preferably *Peronosclerospora*, *Peronospora*, *Phakospora*.

The fungi of the species *Alternaria* are preferably chosen from *A. alternata* (for example *A. alternata* f. sp. *cucurbitae*, *A. alternata* f. sp. *fragariae*), *A. macrospora*, *A. tenuissima*, *A. solani*, *A. arachidis*, *A. brassicae*, *A. brassisicola*, *A. japonica*, *A. citri*, *A. cucumerina*, *A. dauci*, *A. mali*, *A. porri*, *A. radicina* and *A. solani*.

The fungi of the species *Armillaria* are preferably chosen from *A. mellea*, *A. solidipes*, *A. bulbosa*, *A. tabescens*.

The fungi of the species *Ascochyta* are preferably chosen from *A. gossypii*, *A. lentis*, *A. tarda*, *A. tritici*, *A. sorghi*, *A. graminea*, *A. hordei*.

The fungi of the species *Aspergillus* are preferably chosen from *A. flavus*, *A. parasiticus* and *A. niger*.

The fungi of the species *Botryosphaeria* are preferably chosen from *B. disrupta*, *B. obtusa*, *B. glandicola* and *B. rhodina*.

The fungi of the species *Botrytis* are preferably chosen from *B. cinerea* (for example *B. cinerea* var. *coffeae*), *B. allii*, *B. fuckeliana* and *B. vulgaris*.

The fungi of the species *Ceratocystis* are preferably chosen from *C. cacaofunesta*, *C. moniliformis* and *C. paradoxa*.

The fungi of the species *Cercospora* are preferably chosen from *C. beticola*, *C. brassicicola*, *C. circuscissa*, *C. rubrotincta*, *C. citrullina*, *C. coffeicola*, *C. cruenta*, *C. lentis*, *C. zonata*, *C. fragariae*, *C. kikuchii*, *C. janseana*, *C. melongenea*, *C. sojina*, *C. solani*, *C. solani-tubercolosi*, *C. zebrina* and *C. medicaginis*.

The fungi of the species *Cladosporium* are preferably chosen from *C. cladosporioides*, *C. herbarum* and *C. fulvum*.

The fungi of the species *Cochliobolus* are preferably chosen from *C. sativus*, *C. victoriae*, *C. tuberculatus* and *C. miyabeanus*.

The fungi of the species *Colletotrichium* are preferably chosen from *C. arachidis*, *C. dematium* (for example *C. dematus* f. *truncatum*), *C. mangenoti*, *C. fragariae*, *C. gloesporioides*, *C. graminicola*, *C. kahawae*, *C. lindemuthianum*, *C. musae*, *C. orbiculare*, *C. trifolii*, *C. pisi*.

The fungi of the species *Curvularia* are preferably chosen from *C. lunata* and *C. senegalensis*.

The fungi of the species *Didymella* are preferably chosen from *D. arachidicola*, *D. applanata*, *D. bryoniae* and *D. pinodes*.

The fungi of the species *Erysiphe* are preferably chosen from *E. betae*, *E. cichoracearum*, *E. cruciferarum*, *E. graminis*, *E. heraclei*, *E. necator*, *E. pisi* and *E. polygoni*.

The fungi of the species *Fusarium* are preferably chosen from *F. acuminatum*, *F. equiseti*, *F. oxysporum*, *F. pallidoroseum*, *F. culmorum*, *F. poae*, *F. roseum*, *F. sulphureum*, *F. avenaceum*, *F. culmorum*, *F. graminearum*, *F. incarnatum*, *F. solani*, *F. moniliforme* (for example *F. moniliforme asparagi*), *F. oxysporium* (for example *F. oxysporium asparagi*, *F. oxysporium* f. sp. *citri*, *F. oxysporium* f. sp. *phaesoli*, *F. oxysporium* f. sp. *coffea*, *F. oxysporium*, f. sp. *lentis*) and *F. tabacinum*.

The fungi of the species *Ganoderma* are preferably chosen from *G. boninense*, *G. tornatum* and *G. zonatum*.

The fungi of the species *Gibberella* are preferably chosen from *G. baccata*, *G. stilboides*, *G. xylarioides* and *G. zeae*.

The fungi of the species *Glomerella* are preferably chosen from *G. cingulata*, *G. gossypii*. *G. tucamanensis*, *G. falcatum*.

The fungi of the species *Helminthosporium* are preferably chosen from *H. carbonum*, *H. setariae*, *H. rostratum*, *H. solani* and *H. turcicum*.

The fungi of the species *Monilinia* are preferably chosen from *M. fructicola*, *M. fructigena*, *M. laxa*, *M. mali* and *M. oxycocci*.

The fungi of the species *Mycospaerella* are preferably chosen from *M. arachidis*, *M. areola*, *M. berkeleyi*, *M. fijiensis* and *M. gossypina*.

The fungi of the species *Oidium* are preferably chosen from *O. arachidis*, *O. passerinii* and *O. mangifera*.

The fungi of the species *Peronosclerospora* are preferably chosen from *P. maydis*, *P. philippensis*, *P. sacchari*, *P. sorghi*, *P. spontanea*.

The fungi of the species *Peronospora* are preferably chosen from *P. destructor*, *P. fragariae*, *P. lentis*, *P. viciae*, *P. manshurica*, *P. parasitica*, *P. pisi*, *P. tabacina* and *P. trifoliorum*.

The fungi of the species *Phakospora* are preferably chosen from *P. gossypii* and *P. pachyrhizi*, more preferably *P. pachyrhizi* Sydow.

The fungi of the species *Phoma* are preferably chosen from *P. exigua* (for example *P. exigua* var. *foveata*), *P. medicaginis*, *P. pinodella*, *P. trifolii* and *P. oleracea* (for example *P. oleracea* var. *helianthii-tuberosi*).

The fungi of the species *Phomopsis* are preferably chosen from *P. mali*, *P. obscurans*, *P. sclerotoides* and *P. viticola*.

The fungi of the species *Phyllosticta* are preferably chosen from *P. arachidis-hypogeae*, *P. sojaecola* and *P. sojicola*.

The fungi of the species *Phytophthora* are preferably chosen from *P. cactorum*, *P. capsici*, *P. cinnamomi*, *P. citricola*, *P. plamivora*, *P. citriphthora*, *P. hibernalis*, *P. parasitica*, *P. syringae*, *P. infestans*, *P. kernoviae*, *P. megasperma*, *P. nicotianae* and *P. sojae*, more preferably *P. infestans*.

The fungi of the species *Plasmopara* are preferably chosen from *P. crustosa*, *P. halstedii*, *P. lactucae-radicis* and *P. viticola*.

The fungi of the species *Pseudocercospora* are preferably chosen from *P. purpurea*, *P. rhapiscola*, *P. herpitrichoides* and *P. vitis*.

The fungi of the species *Puccinia* are preferably chosen from *P. arachidis*, *P. asparagi*, *P. cacabata*, *P. coronata* (for example var. *hordei*), *P. graminis* (for example f. sp. *tritici* and f. sp. *secalis*), *P. hordei*, *P. pittierana*, *P. psidii*, *P. schedonnardii*, *P. sorghi*, *P. striiformis* (for example f. sp. *hordei*), *P. subnitens* and *P. triticina*.

The fungi of the species *Phythium* are preferably chosen from the species *P. aphanidermatum, P. ultimum, P. arrhenomanes, P. graminicola, P. tardicrescens, P. debaryanum, P. irregulare, P. myriotylum, P. tracheiphilum* and *P. violae*.

The fungi of the species *Rhyzoctonia* are preferably chosen from *R. bataticola, R. cerealis, R. fragariae, R. solani* and *R. zeae*.

The fungi of the species *Sclerotinia* are preferably chosen from *S. libertiana, S. minor, S. sclerotiorum* and *S. trifoliorum*.

The fungi of the species *Septoria* are preferably chosen from *S. citri, S. glycines, S. lactucae, S. nodorum, S. passerinii* and *S. tritici*.

The fungi of the species *Sphacelotheca* are preferably chosen from *S. reiliana, S. fuliginea* and *S. humuli*.

The fungi of the species *Uromyces* are preferably chosen from *U. ciceris-arietini, U. striatus* and *U. fabae*.

The fungi of the species *Verticillium* are preferably chosen from *V. albo-atrum, V. dahliae, V. longisporum, V. tricorpus* and *V. nubilum*.

The treatment or use as bacteriostatic agent is preferably an application aimed at keeping the population of bacteria in the plant and soil unchanged.

The bacteria are preferably chosen from the species *Xanthomonas, Pseudomonas, Bacillus, Curtobacterium* and *Xylella*.

The bacteria of the species of *Xanthomonas* are preferably chosen from *X. alfalfa, X. campestris* (for example *X. campestris* pv. *pruni, X. campestris* pv. *campestris, X. campestris malvacearum, X. campestris* pv. *phaseoli, X. campestris* pv. *vitians, X. Campestris* pv. *glycines* e *X. Campestris* pv. *oryzae*) *X. citri* (for example *X. citri* subsp. *malvacearum*), *X. oryzae* (for example *X. Oryzae* pv. *oryzicola*), *X. fragariae, X. beticola, X. vescicatoria* and *X. ampelina* (also known as *Xylophilus ampelinus*).

The bacteria of the species *Pseudomonas* are preferably chosen from *P. syringae* (for example *P. syringae* pv. *syringae, P. syringae* pv. *tabaci, P. syringae* pv. *pisi* and *P. syringae* pv *phaseolicola*), *P. amygdali* (for example *P. amygdali* pv. *glycinea*), *P. solanacearum, P. cichorii, P. avenae, P. andropogonis, P. marginalis, P. savastanoi, P. fluorescens* and *P. fuscovaginae*.

The bacteria of the species *Bacillus* are preferably *B. subtilis*.

The bacteria of the species *Curtobacterium* are preferably *C. flaccumfaciens* pv. *flaccumfaciens*.

The bacteria of the species *Xylella* are preferably *X. fastidiosa*.

When the treatment or use of the suspension of the invention is as fungicide or bacteriostatic agent, the metal is preferably copper.

The treatment or use as nematostatic agent is preferably an application aimed at keeping the population of nematodes in the soil unchanged.

The nematodes are preferably chosen from *Meloidogynae* (for example *M. arenaria, M. hapla, M. incognita, M. javanica, M. graminicola, M. enterolobii, M. artiellia*), *Mesocriconema* (for example *M. xenoplax*), *Xiphinema* (for example *X. americanum, X. rivesi*), *Pratylenchus* (for example *P. penetrans, P. dulscus, P. vulnus, P. coffeae, P. brachyurus, P. thornei, P. zeae*), *Criconemella* (for example *C. xenoplax*), *Helicotylenchus, Radopholus* (for example *R. similis*), *Tylenchus* (for example *T. semipenetrans*), *Heterodera* (for example *H. avenae, H. filipjevi, H. schachtii, H. latipons, H. carotae, H. ciceri, H. rosii, H. zea, H. puntodera chalcoensis, H. dihystera, H. goettingiana*), *Subanguina* (for example *S. radicicola*), *Merlinius* (for example *M. brevidens*), *Tylenchornicus* (for example *T. dubius, T. maximus*), *Paratylenchus* (for example. *P. hamatus, P. brachyurus, P. coffeae*), *Rotylenchulus* (for example *R. reniformis*), *Helicotylenchus, Belonolaimus* (for example *B. longicaudatus*), *Paratrichodorus* (for example *P. minor, P. christiei*), *Tylencorhynchus* (for example (*T. claytoni, T. brevilineatus*), *Hoplolaimus* (for example *H. uniformis, H. columbus, H. galeatus*), *Dolichodorus, Trichodorus, Ditylenchus* (for example *D. dipsaci, D. angustus, D. destructor*), *Areacerus* (for example *A. fasciculatus*), *Xylosandrus* (for example *X. compactus* and *X. morigerus*), *Hypothenemus* (for example *H. hampei*), *Globodera* (for example *G. tabacum*), *Longidorus, Nacobbus* (for example *N. dorsalis*), *Macroposthonia* (for example *M. ornata*), *Scutellonema* (for example *S. cavenessi*), *Aphelencoides* (for example *A. besseyi*), *Hirschmanniella* (for example *H. oryzae*) *Anguina* (for example *A. tritici*).

The treatment or use as insecticide is preferably a treatment or use for preventing and/or combating insect infestation.

The insects are preferably soil insects and/or leaf insects.

The soil insects are preferably chosen from *Chamaepsila rosae, Diaprepes abbreviatus, Phyllotreta striolata, Agriotes sputator, Agriotes lineatus, Agriotes obscurus, Diabrotica, Tipula oleacera, Tipula vernalis, Tipula paludosa, Tiracola* (for example *T. plagiata*), *Scutigerella immaculata, Mamestra configurata, Delia radicum, Pieris brassicae* and *Zabrus tenebrioides*.

The leaf insects are preferably chosen from *Hypera postica, Mythimna unipuncta, Empoasca fabae, Tiracola plagiata, Aleurodes Bemisia tabaci, Trialeurodes vaporariorum, Anthonomus musculus, Pieris rapae, Chamaepsila rosae, Myzus* spp. (for example *M. cerasi*), *Rhagoletis cerasi, Bruchus pisorum, Acanthoscelides* spp., *Aphis gossypii, Aulachortum solani, Franklinielia occidentalis, Dolichodorus* spp., *Heterodera* spp. *Scirtothrips citri, Selenothrips rubrocintus, Heliothrips haemorrhoidalis, Earias biplaga, Ephestia elutella, Zeuzera coffeae, Characoma stictigrapta, Conopomorpha cramerella, Planococcus* sp. *Stictococcus* sp., *Coccus viridis, Toxoptera aurantii, Mallodon downesii, Rhynchophorus ferrugineus, Araecerus fasciculatus, Xylosandrus compactus, Xylosandrus morigerus, Hypothenemus hampei, Ceratitis capitata, Coccus viridis, Antestiopsis orbitalis, Auximobasis coffeaella, Leucoptera caffeina, Perileucoptera coffeella, Pheidole megacephala, Anoplolepsis longipes, Macromischoides aculeatus, Anthonomus grandis, Helicoverpa zea, Pectinophora gossypiella, Scirtothrips dorsalis, Oxycarenus hyalinipennis, Lygus lineolaris, Spodoptera frugiperda, Aonidiella aurantii, Aleurocanthus woglumi, Diaphorina citri, Diaprepes abbreviatus, Planococcus citri, Lepidosaphes beckii, Phyllocnistis citrella, Anoplophora chinensis, Coccus hesperidum, Otiorhynchus sulcatus, Ampeloglypter ater, Pseudococcus maritimus, Popilia japonica, Scaphoideus titanus, Tetranychus urticae, Lobesia botrana, Eupoecilia ambiguella, Phyllotreta striolata, Bruchus rufimanus, Thrips tabaci, Bruchus lentis, Cydia nigricana, Agriotes* sp., *Frankliniella occidentalis, Aphis nasturtii, Agriotes sputator, Agriotes lineatus, Agriotes obscurus, Ostrinia nubialis, Methopolophium dirhodum, Rhopasoliphum padi, Sitobion avenae, Oscinella frit, Drosicha mangiferae, Ceratitis rosa, Sternochetus mangiferae, Deanolis sublimbalis, Thylacoptila paurosema, Toxoptera odinae, Trichodorus* spp., *Mamestra configurata, Plutella xylostella, Alticini* spp., *Murgantia histrionica, Lygus* spp., *Ceuthorhynchus napi gyllenhal, Ceutorhynchus picitarsis, Meligethes aeneus, Pieris brassicae, Bactrocera oleae, Conotrachelus nenuphar, Ditylenchus dipsaci, Sitona*

*lineatus, Frankliniella robusta, Contrarinia pisi, Acyrthosiphon pisum, Melanchra pisi, Lacanobia oleracea, Autographa gamma L., Pseudaletia unipuncta L., Rhizopertha* spp., *Stegasta bosqueella, Callosobruchus* spp., *Typhaea stercorea, Maconellicoccus hirsutus, Scapteriscus vicinus, Phtorimaea operculella, Macrosiphum euphorbiae, M. graminicola, Tuta absoluta, Aculops lycopersici, Manduca quinquemaculata, Diuraphis noxia, Rhopalosiphum padi, Oulema melanopus, Oulema lichensis, Leptinotarsadecemlineata* (Colorado potato beetle).

The treatment or use as slug killer is preferably a treatment or use for preventing and/or combating infestation from gastropods, more preferably *Deroceras reticulatum.*

When the treatment or use of the suspension of the invention is as insecticide, nematostatic agent or slug killer, the metal is preferably zinc.

It is within the ability of the skilled person in the field to establish the concentration, quantity and frequency of the application of the aqueous suspension of the invention depending on the plant in question, the use to be made of the suspension (fertilizer or phytoprotective agent), the presence and gravity of an infestation, and the result to be obtained.

As discussed above, it is known that the production of a suspension with a high content of macro- and micro-nutrients is made difficult by the tendency of metals to precipitate from the suspension, forming a precipitate.

This phenomenon has so far always hindered the production of high concentration metal and polyphenol suspensions, that are stable and homogeneous and suitable for dilution and application to plants.

The Applicant has now surprisingly found that thanks to the particular formulation at the basis of the suspension of the invention, a very high concentration of metals and polyphenols in suspension can be reached, together with a more effective action of the metals, the suspension remaining pourable and pumpable and therefore convenient to use.

Without wishing to be bound by any theory, it is believed that the formulation of the present invention, and in particular the interaction between the dispersing agent, the metal and the polyphenol, in the respective indicated quantities, allows a suspension to be obtained in which part of the high concentration of metal is complexed by the polyphenols, in particular by tannin, while the remaining part of the metal is in free form.

It is therefore believed that the partial complexation of the metals, as also the modulation of the rheology of the suspension through the dispersing agent, is at the basis of the ability of the suspension of the invention of retaining a higher concentration of the metals, compared to what is normally possible, without their precipitating to form sediments.

As already mentioned above, a liquid suspension has advantages with respect to a composition in the form of powder, granules or in a non-homogeneous suspension, as it allows the suspension itself to be easily, homogeneously and repeatably distributed on the plants or in the surrounding soil.

Furthermore, thanks to the high concentration of active ingredients that can be obtained in the suspension of the invention, and thanks to the synergy established between the polyphenol and the metal, there will be a faster absorption of the suspension in addition to a greater efficacy. This in turn leads to a saving in time and costs in the treatment of plants and in the transportation and storage of the fertilizer itself, ease of handling thanks to the pumpability of the suspension in addition to a reduced production of volatile powders, potentially harmful for the operator.

In particular, thanks to the synergic effect that enhances the efficacy of the suspension, the concentration of metal being equal, the desired results can be obtained, applying a smaller quantity of metal. This can be particularly advantageous in cases in which the metal is susceptible to accumulation and phytotoxicity (such as for example in the case of copper).

It has been observed in particular that, thanks to the suspension of the present invention, it is possible to dose about 30% less, by weight, of active ingredients, the hectares to be treated being equal, compared to a conventional product of the prior art such as, for example, a solution of sulphate or an EDTA chelate, with a consequent proportional saving of resources for the operator.

Without wishing to be bound by any theory, in the particular case of the metal copper, it is believed that the complexation between the copper and the polyphenol, in particular tannin, can be facilitated by the presence of monoethanolamine, in the quantities indicated in the description. It is believed in fact that the latter, as also compounds capable of performing an equivalent function, such as, for example, ammonia, by acting through a redox reaction on the copper, and thus changing its oxidation state, adjusts the activity of the copper with respect to the polyphenol, preventing an excessively violent reaction between the two components which would lead to the immediate formation of solid precipitates, and therefore helping to promote the complexation of the polyphenol with the metal.

Thanks to the monoethanolamine (or ammonia), the polyphenol and part of the metal can therefore be complexed, and the excess of metal, as previously discussed, also remains in suspension, thanks to the action of the dispersing agent.

The dispersing agent can, in particular, be a polyacrylate or soy lecithin. In particular, it has been observed that when the metal is copper or manganese, the most effective dispersing agent is polyacrylate, whereas when the metal is zinc, the most effective dispersing agent is soy lecithin.

It is believed that the dispersing agent acts so as to prevent the aggregation of the particles in suspension, in particular the particles of complexed metal.

The presence of at least one thickener allows the precipitation of the suspension to be further delayed. The presence, in fact, of xanthan gum, for example, allows a thixotropic behaviour of the suspension to be obtained, thanks to which the suspension at rest has a relatively high viscosity, sufficient for allowing the components to remain in suspension. The same suspension, on the other hand, when subjected to shear stress, has a viscosity which is sufficiently reduced as to make the suspension easy to dose and dilute before application.

Of course, as it is an aqueous suspension, its dilution in water is easy and does not cause any inconvenience in terms of homogeneity of the nutrients.

The suspension of the present invention is therefore easy to use and can be applied both to the soil and directly on the plant, in applications that require a fertilizing action and also in applications requiring a phytoprotective action.

In the case of application with a fertilizing action, the suspension can be applied either directly to the plants, or in the soil, or both methods. It has been observed that numerous plants can benefit from this type of application and the suspension can comprise one or more of the metals indicated and described above.

Also with respect to a phytoprotective action, it has been observed that the suspension of the present invention is particularly suitable for preventing and controlling infesta- 
tions on the part of fungi, nematodes, parasites and other pathogens. In particular, it has been observed that suspensions comprising copper or zinc are particularly suitable in phytoprotective applications with respect to *Phakospora pachyrhizi* H. Sydow in Soya (*Glycine max*).

EXAMPLE 5

Chemical and Rheological Analysis of the Suspensions.

0.5 litre samples of the suspensions of Examples 1-4 were taken at the time of storage.

The samples were subjected to chemical analysis and the results are summarized in Tables 4a-d.

TABLE 4a

Measurements of the chemical analysis of the fertilizer of Example 1

| Characteristic | Measurement |
|---|---|
| Quantity of copper (Cu) (in weight percent on the total weight of the sample) | 20.0% |
| Quantity of urea nitrogen (N) (in weight percent) on the total weight of the sample | 1.0% |
| Density (kg/dm$^3$) | 1.48 |
| pH | 8.9 |

TABLE 4b

Measurements of the chemical analysis of the fertilizer of Example 2

| Characteristic | Measurement |
|---|---|
| Quantity of zinc (Zn) (in weight percent on the total weight of the sample) | 20.0% |
| Quantity of urea nitrogen (N) (in weight percent) on the total weight of the sample | 1.0% |
| Density (kg/dm$^3$) | 1.45 |
| pH | 8.0 |

TABLE 4c

Measurements of the chemical analysis of the fertilizer of Example 3

| Characteristic | Measurement |
|---|---|
| Quantity of manganese (Mn) (in weight percent on the total weight of the sample) | 20.0% |
| Quantity of urea nitrogen (N) (in weight percent) on the total weight of the sample | 1.0% |
| Density (kg/dm$^3$) | 1.55 |
| pH (in aqueous solution at 1% at 20° C.) | 5.6 |

TABLE 4d

Measurements of the chemical analysis of the fertilizer of Example 4

| Characteristic | Measurement |
|---|---|
| Quantity of copper (Cu) (in weight percent on the total weight of the sample) | 20.0% |
| Quantity of urea nitrogen (N) (in weight percent) on the total weight of the sample | 1.0% |
| Density (kg/dm$^3$) | 1.48 |
| pH | 8.9 |

An analysis of the viscosity of the samples was also carried out, at the time of storage, using a Brookfield Mod LVDV-I Prime Rotoviscometer. The viscosity was measured in cP using a Brookfield instrument with a rotor nr. 63, a speed of 60 rpm, with a torque ranging from 10 to 100% at a temperature of 20° C.

A viscosity of 1,800 cP was measured for the suspension of Example 1; a viscosity of 1,300 cP was measured for the suspension of Example 2; a viscosity of 1,350 cP was measured for the suspension of Example 3; and a viscosity of 300 cP was measured for the suspension of Example 4.

The quantities of metals were measured according to the procedures indicated in the Regulation CE 2003/2003 and subsequent modifications.

EXAMPLE 6

Comparison tests of foliar fertilization between the aqueous suspension of Example 1 and a fertilizing product containing copper sulphate and without tannins, on vine plants.

Potted seedlings of the cultivar Pinot nero clone MIRA 95-3047 grafted on 420 A clone 758, were used.

A blank (nr. 1) and two objects (nr. 2, 3) of plants were compared according to the scheme of Table 5.

TABLE 5

Test plan

| Number | Treatment |
|---|---|
| 1 | Blank, no treatment |
| 2 Cu__SO$_4$ | Treatment with aqueous suspension of Example 1 |
| 3 Cu__SCL | Treatment with aqueous solution of copper sulphate at 120 gr/l of Cu. |

The comparative objects (2,3) were tested with three replications, each composed of six plants.

The plants derived from cuttings grown for about a month in a greenhouse under good edaphic and water conditions, and subsequently aggregated in pots each containing three plants, composing for each object three replications of 6 plants each, for a total of 18 plants per object.

The plants in each pot showed a similar growth rate.

On the first day of treatment (day 0), prior to application of the treatment, the length of the main shoot was measured from all of the test plants. These measurements were carried out at day 0 (T 0), seven days after treatment (T 7) and three weeks after treatment (T 21).

On day 0, three samples of leaves were taken before the treatment, to be used for mineral analysis of the Cu content, in order to monitor its content and have the initial point of the estimate before the differentiation of the foliar treatments with the Cu-based product. The leaves were picked by sampling the fourth node in the basal position of the main bud. These detections were carried out at time 0 (T 0), 12 hours after treatment (T 12 hours), 36 hours after treatment (T 36 hours) and 7 days after treatment (T 7 days).

For all the foliar samples (time 0, 12 hours, 36 hours, 7 days after treatment), after collection, the leaves were sent to an analysis laboratory and after washing the same with a solution at 0.2% of citric acid, they were dried, essiccated, ground and analyzed to determine the Cu content by means of mass spectrometry with inductively coupled plasma source, using instrument ICP-MS Agilent 7500 ce (distributed by Agilent Technologies, Japan).

The differentiated fertilizations were carried out on day 0 (T 0), using a nebulizer and wetting the leaves of the test plants until they were dripping, according to the dosages indicated in Table 6.

TABLE 6

Summary of the dosages

| Product | Dose of product used (l/ha) | Dose of product used (l/hl[1]) | Dose of solution administered to the plant (ml/plant)[2] | Dose of Cu used (gr/Ha) |
|---|---|---|---|---|
| 1 | 0 | 0 | 0 | 0 |
| 2 | 0.400 | 0.180 | 0.080 | 120 |
| 3 | 1.000 | 0.450 | 0.200 | 118.4 |

[1]Wetting 222 l/ha;
[2]Considering a density of 5,000 plants/ha

The plants of the blank were wetted only with water.

At a distance of 12 and 36 hours from the treatment, in each replication per object, leaves of the same age as those previously sampled at day 0 were removed, selecting leaves from the third to the eleventh node and more specifically those positioned at the $3^{rd}$, $6^{th}$, $8^{th}$ and $10^{th}$ node 12 hours after treatment and those positioned at the $5^{th}$, $7^{th}$, $9^{th}$, and $11^{th}$ node 36 hours after treatment.

The final sampling of the estimate was made on day 7 (T 7) and involved the collection of leaves of analogous age as those taken in the previous surveys, thus excluding newly formed leaflets, selecting the second and twelfth leaf of the plants of each object, aggregating them without distinction of replications.

Figure 1:
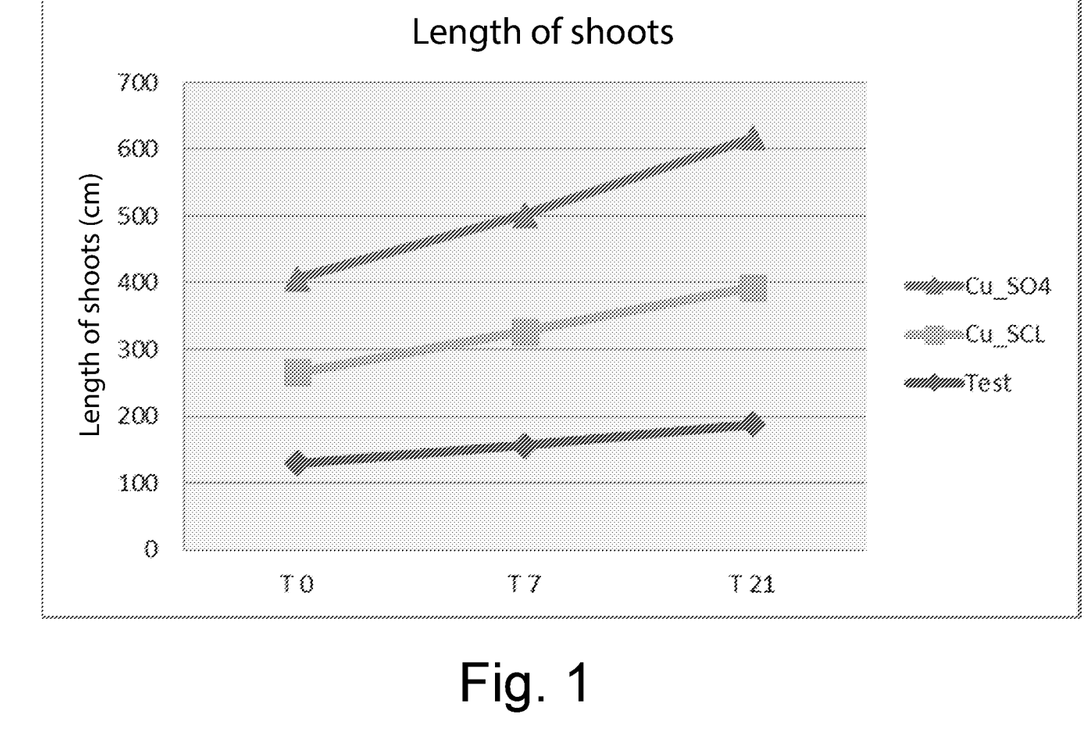
FIG. 1 is a graph showing the average values of the lengths of plant shoots in the test
Figure 2:
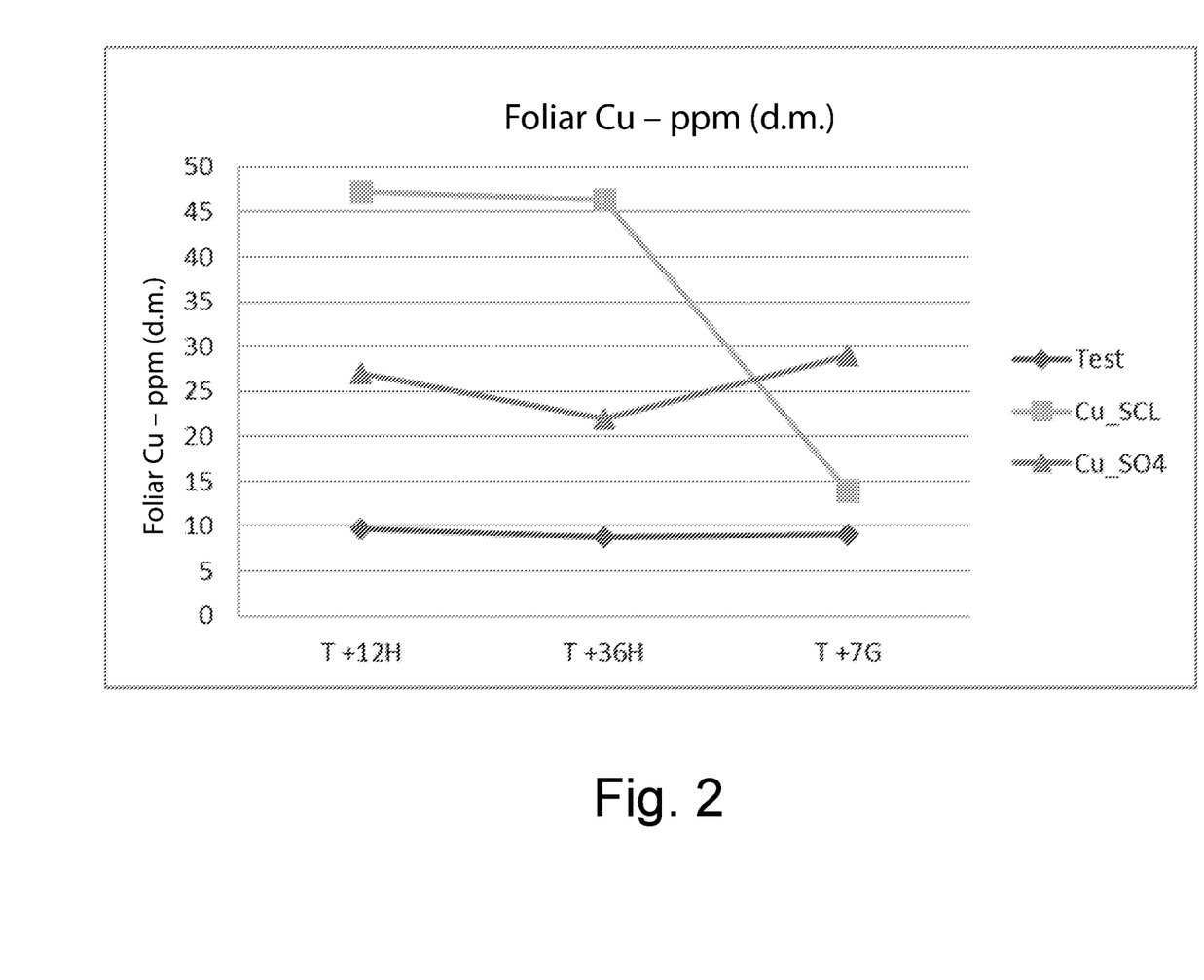

The data are summarized in Tables 7 and 8 and in FIGS. 1 and 2, which report the average values for compared objects. The data were subjected to variance analysis using the statistical package SYSTAT; the values of the averages were separated by the Tukey test. Significantly different values are indicated with different letters and highlighted in bold print. The significance levels (sign.) reported and indicated with n.s., *, , *, respectively indicate not significant and significance in relation to the probability (P) for values of P≤0.05 and P≥0.01, P<0.01 and P≥0.001, P<0.001.

The plants selected for the test, at the time of the various fertilizations (Time 0) had analogous growth values, whereas they later suffered from influences in growth attributable to the fertilizations (FIG. 1, Table 7).

TABLE 7

Measurement of growth. Average values of the lengths of the shoots, the number of internodes and lengths of the internodes of the plants selected for physiological measurements in relation to the objects at different measurement times (T = time). The apexes 1 and 2 indicate groups of statistically analogous values.

| | Parameters | | | | | | | | |
|---|---|---|---|---|---|---|---|---|---|
| | Length of shoot (cm) | | | Number of internodes | | | Length of internodes (cm) | | |
| Object | T 0 | T 7 | T 21 | T 0 | T 7 | T 21 | T 0 | T 7 | T 21 |
| 1 | 129.7 | 156.3 | 187.7 | 25.7 | 29.7 | 31.7 | 5.10 | 5.30[1] | 5.95[1] |
| 2 | 136.3 | 170.3 | 205.0 | 26.0 | 30.3 | 34.3 | 5.24 | 5.61[2] | 5.96[1] |
| 3 | 140.7 | 174.7 | 224.3 | 27.3 | 30.7 | 36.0 | 5.15 | 5.69[2] | 6.23[1] |
| Sign. | n.s. | n.s. | n.s. | n.s. | n.s. | n.s. | n.s. | * | ** |

From Table 7 it can be noted that both the object 2 sample and the object 3 sample have values higher than those of the blank object nr. 1 for all the parameters tested and at all the different measurement times. In particular, the length of the internodes at time T7 is much higher for both sample 2 and sample 3 compared to the blank.

With regard to the absorbance efficiency of object nr. 2, representative of the suspension of Example 1, compared with object 3, representative of commercial products containing elements in the form of sulphates, the data collected in the test appear to be extremely interesting.

TABLE 8

Average values of the concentrations and absorption efficiencies (EA) of copper in relation to the objects at different measurement times (T = time). The apexes 1, 2 and 3 indicate groups of statistically analogous values.

| | T 0 | T 12 hours | | T 36 hours | | T 7 days | |
|---|---|---|---|---|---|---|---|
| Object | ppm (d.m.) | ppm (d.m.) | EA % | ppm (d.m.) | EA % | ppm (d.m.) | EA % |
| 1 | 10.7 | 9.7[3] | −9.5 | 8.7[3] | −19.0[3] | 9.0 | −15.9 |
| 2 | | 47.3[1] | 342.4[1] | 46.3[1] | 333.0[1] | 14.0 | 30.8 |
| 3 | | 27.0[2] | 152.3[2] | 22.0[2] | 105.6[2] | 29.0 | 171.0 |
| Sign. | | *** | *** | *** | *** | | |

As can be seen from Table 8 and FIG. 2, the provision of copper in complexed form with tannin proved in fact to be much more efficient than that in sulphate form, at both 12 hours and at 36 hours after treatment. Both of the objects, however, differed significantly from the others not bearing Cu, increasing their foliar values. In particular, the object with copper complexed with tannin (object nr. 2) showed a double copper absorption with respect to the object treated with copper alone (object nr. 3) at time hours and 36 hours. 7 days after treatment, the complexed form with tannin appears less efficient than that with sulphate.

It can therefore be concluded that the suspension of Example 1 has an optimum capacity of being rapidly absorbed by the leaves without causing any phytotoxicity. This is obviously an advantage, as a slow absorption would make the treatment product susceptible to being exposed to rain, and therefore to be washed away.

No appearance of disease was found during the whole period of study.

The suspension of Example 1 is therefore suitable for use by spraying on vine plants, it is rapidly absorbed and has performances comparable to products present on the market.

EXAMPLE 7

Comparison Tests Between the Aqueous Suspension of Example 1 and a Commercial Fungicide A test was carried out on site to compare the fungicidal action of the suspension of Example 1 with respect to a fungicide of the known art (Unizeb Gold®, common name Mancozeb, distributed by UPL, Brazil) against infestation from Asian rust (*Phakopsora pachyrhizi Sydow*) in soybean plants (*Glycine max* (L.) Merrill). The test was carried out in the Estacão Experimental da Cabeda: Pesquisa and Desenvolvimento, of Agua Santa-RS, Brazil.

Two commercial varieties of soybean plant were used in this test, known as DM 5859 (distributed by the company Donmario, Brazil) and NS 6209 (distributed by Nidera Sementes, Brazil) which were grown in soil, with a density of about 250,000 plants per hectare.

Each plant was treated, starting from stage 31 of the BBCH scale (Biologische Bundesanstalt Bundessortenamt and Chemische Industrie) with 250 kg/ha of a product having formula N—$P_2O_5$—$K_2O$, wherein each kilo of product contains 4% of nitrogen (N), 32% of phosphoric anhydride ($P_2O_5$) and 10% of potassium oxide ($K_2O$), and 120 kg/ha of potassium chloride (KCl), which were applied in open field. Each plant was also treated with three applications of Roundup® (licensed product of Monsanto Company, USA) in a quantity of 2.0 l/ha, of which the first application was effected before sowing, and the subsequent applications after the growth of the soybean.

During the cultivation cycle, four applications of insecticide were also carried out. The first with chlorantraniliprole at a dose of 0.05 l/ha at stage 51 (Feb. 5, 2016), at the beginning of inflorescence, the second (with the same insecticide) at stage 65 (Feb. 20, 2016), with full inflorescence (about 50% of the flowers open), the third at stage 75 (Mar. 5, 2016) (when about 50% of the plants had reached the typical size), and the fourth at stage 79 (Mar. 13, 2016) (when almost all the plants had reached the typical size), in compliance with the BBCH scale.

The test consisted of six treatments (including the blank), the doses being summarized in Table 9, in which Fox (Bayer CropScience) Aureo (Adjuvant—Bayer CropScience), Elatus (Syngenta) and Nimbus (Adjuvant—Syngenta) are systemic and adjuvant fungicides, whereas Unizeb Gold® is a contact fungicide and Cu_SCL a fertilizer corresponding to the suspension of Example 1.

TABLE 9

Summary of the treatment (WG = dispersible granulate; SC = concentrated suspension, EC = Concentrated Emulsion; B, C, D, E and F respectively correspond to day 0, 20, 35, 48 and 63 after treatment)

| Treatment nr.. | Description of product | Form | Concentration and Active ingredient (IA) | Dosage | Measurement unit of dosage | Time point of application |
|---|---|---|---|---|---|---|
| 1 | Blank | na | na | na | na | na |
| 2 | FOX | SC | 325 | 0.40 | l/ha | BEF |
|   | AUREO | EC | 720 | 0.25 | % v/v | BEF |
|   | ELATUS | WG | 450 | 0.20 | kg/ha | CD |
|   | NIMBUS | EC | 428 | 0.50 | % v/v | CD |
| 3 | UNIZEB GOLD | WG | 750 | 1.50 | Kg/ha | BCDEF |
|   | FOX | SC | 325 | 0.40 | l/ha | BEF |
|   | AUREO | EC | 720 | 0.25 | % v/v | BEF |
|   | ELATUS | WG | 450 | 0.20 | kg/ha | CD |
|   | NIMBUS | EC | 428 | 0.50 | % v/v | CD |
| 4 | Cu_SCL | SC | 296 | 0.30 | l/ha | BCDEF |
|   | FOX | SC | 325 | 0.40 | l/ha | BEF |
|   | AUREO | EC | 720 | 0.25 | % v/v | BEF |
|   | ELATUS | WG | 450 | 0.20 | Kg/ha | CD |
|   | NIMBUS |    | 428 | 0.50 | % v/v | CD |
| 5 | Cu_SCL | SC | 296 | 0.50 | l/ha | BCDEF |
|   | FOX | SC | 325 | 0.40 | l/ha | BEF |
|   | AUREO | EC | 720 | 0.25 | % v/v | BEF |
|   | ELATUS | WG | 450 | 0.20 | kg/ha | CD |
|   | NIMBUS |    | 428 | 0.50 | % v/v | CD |
| 6 | Cu_SCL | SC | 296 | 1.00 | l/ha | BCDEF |
|   | FOX | SC | 325 | 0.40 | l/ha | BEF |
|   | AUREO | EC | 720 | 0.25 | % v/v | BEF |
|   | ELATUS | WG | 450 | 0.20 | kg/ha | CD |
|   | NIMBUS |    | 428 | 0.50 | % v/v | CD |

The plots consisted of five rows (spaced from each other at 0.45 m) 5.0 metres long, for a total of 2.25 m×5.0 m (11.25 m$^2$) in each plot.

Five applications were carried out (B, C, D, E, F) of each treatment listed in Table 9.

The treatments of Table 10 were carried out according to the program of applications illustrated in Table 9, in which complementary information is also provided, such as the climatic conditions at the time of application.

TABLE 10

Program of applications

| Application | Time | B | C | D | E | F |
|---|---|---|---|---|---|---|
|   | Day | 0 | 20 | 35 | 48 | 63 |
|   | Phenological phases (BBCH) | 31 | 51 | 61 | 71 | 81 |
|   | Coverage (%) | 80 | 100 | 100 | 100 | 100 |
|   | Height (cm) | 25 | 45 | 60 | 75 | 75 |
|   | Relative humidity (%) | 55 | 70 | 80 | 60 | 55 |
|   | Temperature (° C.) | 31 | 25 | 28 | 28 | 29 |
|   | Wind | Strong | Weak | Weak | Weak | Weak |
|   | Cloudiness | 0 | 100 | 10 | 0 | 0 |
|   | Humidity   soil | Dry | Wet | Wet | Dry | Dry |
|   |            plant | Dry | Wet | Wet | Dry | Dry |

TABLE 10-continued

| | Program of applications | | | | | | |
|---|---|---|---|---|---|---|---|
| % Application severity[1] | DM5958 | Rust | 0 | 2 | 20 | 40 | 50 |
| | NS6209 | Rust | 0 | 5 | 35 | 50 | 60 |

[1]The application severity percentage was measured according to the diagrammatic scale referred to in Cantieri, M. G. & Godoy, C. V. Phytopathologica, Araras, SP.2003. Vol. 1, p. 32.

The application was carried out using a portable precision nebulizer, pressurized with $CO_2$ at a pressure of 3.0 Bar, with an application dosage of 150 l/ha.

The experimental arrangement was 5 rows for each of the six treatments and three repetitions.

At the end of the growth cycle, on day 81, the mechanical collection of the plots was carried out for a collection area of 6.75 m². The plants were cleaned, weighed and their humidity was measured (14%) and consequently their mass. The yield of grains was expressed in sacas/ha (with a humidity of 14%).

Figure 3:
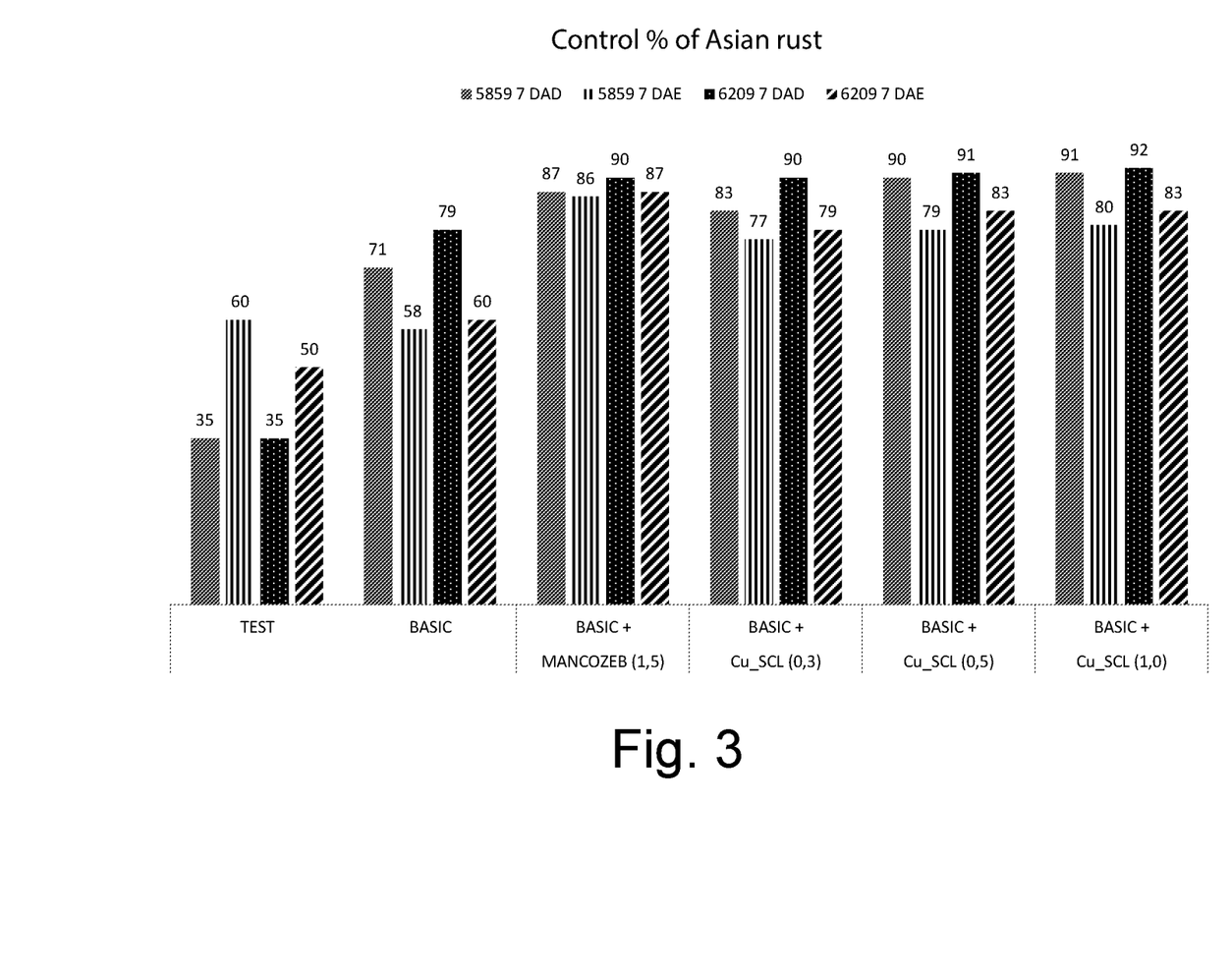

The results are summarized in FIG. 3, which shows the measurement of Asian rust control seven days after application at the time D (7 DAD) and seven days after application at the time E (7 DAE) in the two varieties of soybean.

Figure 4:
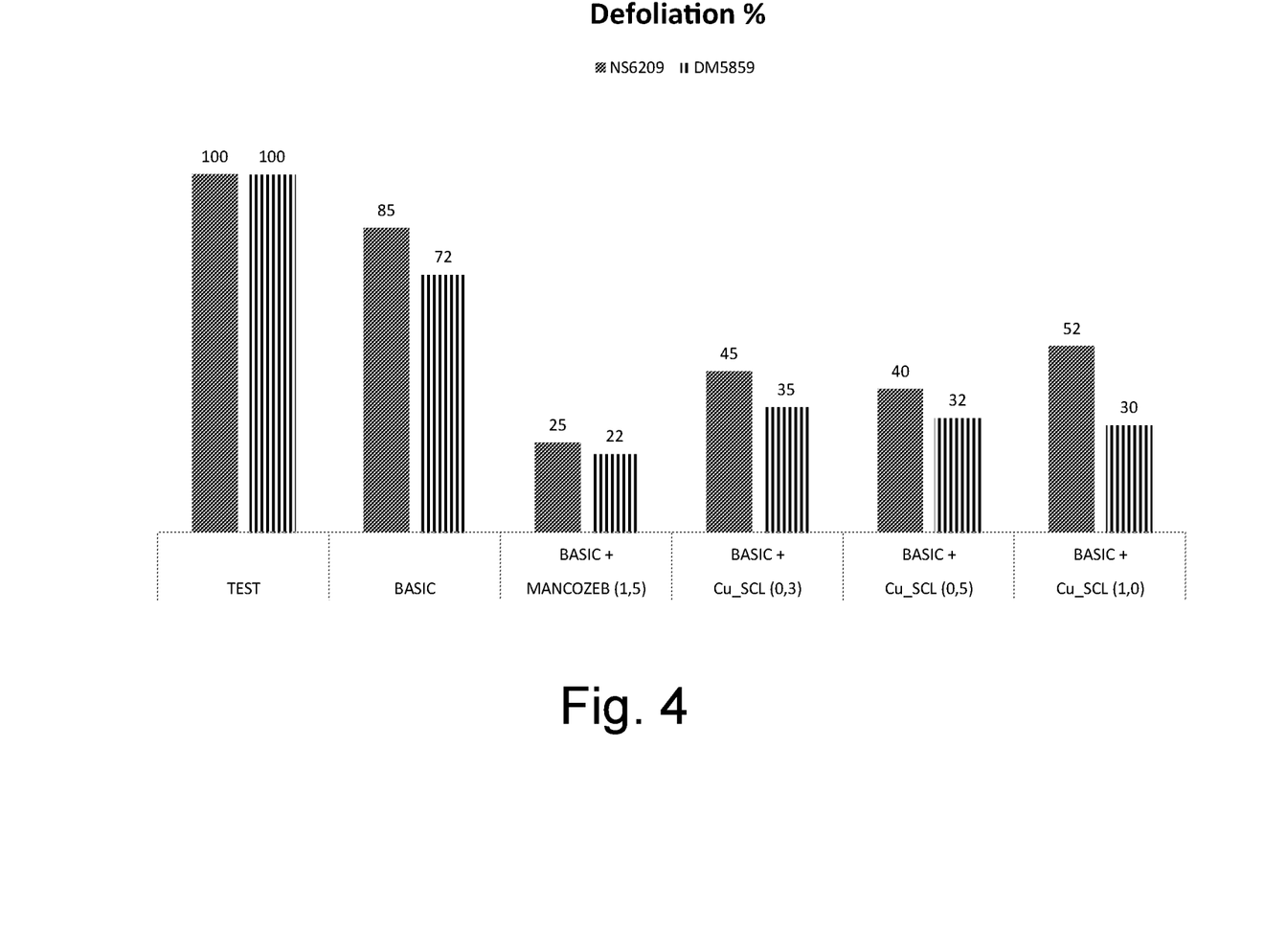

FIG. 4 shows the degree of defoliation of the soybean plants measured ten days after the time F (10 DAF).

It can be observed from FIG. 3 that the addition even of only 0.3 l/ha of Cu_SCL resulted in an increased control efficiency of the disease in both of the varieties tested, compared with the treatment plan nr. 2 with only systemic fungicides.

The efficiency of control on the disease was determined with the qualitative evaluation of the state of the leaves on the basis of an assessment scale referred to in Canteri, M. G. & Godoy, C. V., Phytopathologica, Aras, SP. 2003. Vol 1, p. 32.

With respect to the treatment with UNIZEB GOLD®, it was observed that the efficiencies of the treatments were comparable with each other even if the dosage of Cu_SCL (0.3, 0.5 and 1.0 l/ha) was never as high as that of UNIZEB GOLD® (1.5 kg/ha) but at the most two thirds.

FIG. 4 shows that, whereas the blank suffered a severe defoliation following uncontrolled disease, the treated plants were protected from the phenomenon in varying degrees. The plants subjected to treatment nr. 2 suffered a severe defoliation as the systemic treatment was not sufficient.

Treatment nr. 3 with UNIZEB GOLD® gave a lesser defoliation with respect to treatments 4-6 with Cu_SCL. Again, it should be considered that treatments 4-6 provide a lower dosage with respect to treatment with UNIZEB GOLD®.

Figure 5:
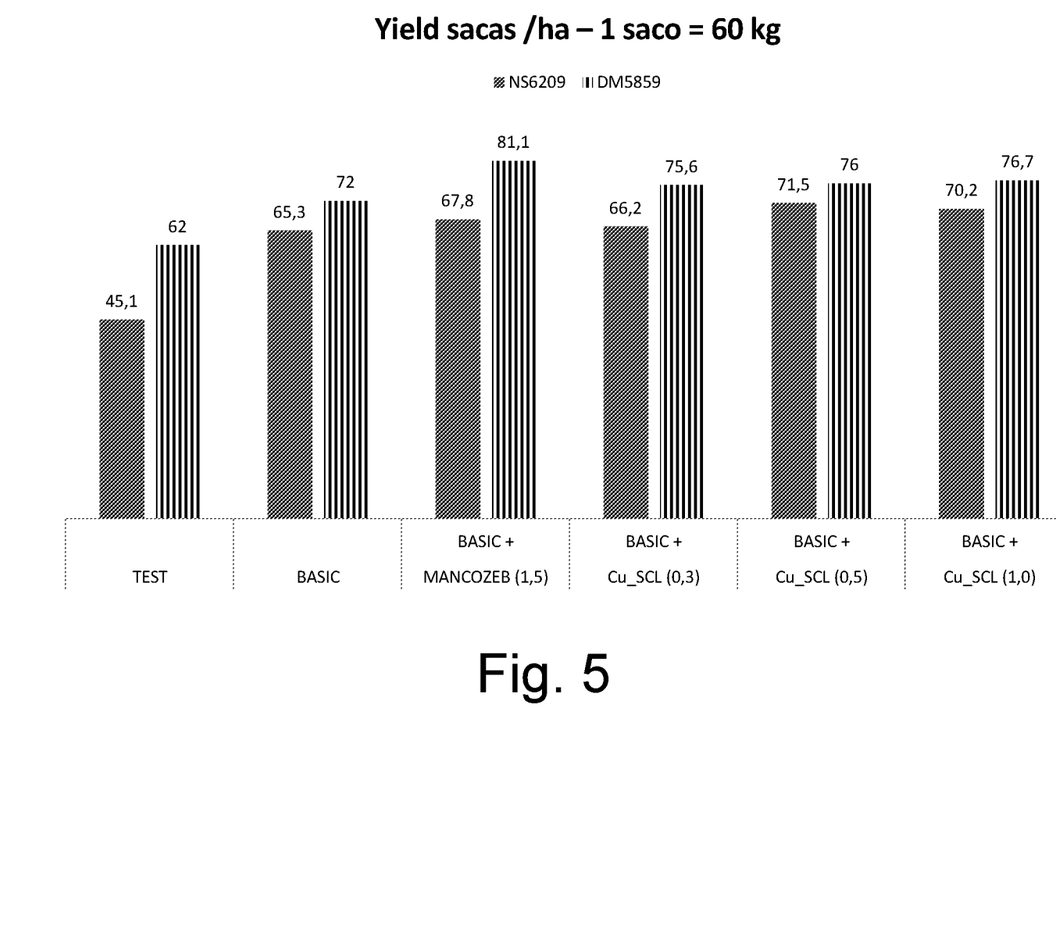

FIG. 5 shows a comparison of the yield of soybean expressed in sacas per hectare for both of the varieties. Each saca corresponds to 60 kg.

As can be seen, the yield obtained following treatment with Cu_SCL was comparable to, and in the variety 6209 even higher than the plants that had been treated with UNIZEB GOLD®.

This result is even more significant considering that the same plants had suffered a greater defoliation with respect to plants treated with UNIZEB GOLD® (see FIG. 4). Defoliation, in fact, causes less photosynthesis, which in turn theoretically leads to a lesser productivity.

No phytotoxicity phenomenon due to the suspension of Cu_SCL, was observed.

This study therefore shows that the suspension of the present invention is a valid substitute of a commercial fungicide as it has a similar efficiency in controlling Asian rust and gives rise to comparable or even higher plant yields. With respect to this product, the suspension of the present invention has the advantage of not being phytotoxic.

EXAMPLE 8

Preparation of a Copper Oxide and Tannin Aqueous Suspension.

The process described in Example 1 was repeated with the difference that the ingredients listed in Table 11 were added to 480.0 litres of potable water.

TABLE 11

| List of ingredients | |
|---|---|
| Ingredient | Quantity (kg) |
| Soy lecithin | 40 |
| Tannin[1] | 100 |
| Urea | 50 |
| Alkylphenolethoxylate | 2 |
| Sodium polyacrylate (solution at 40% by weight on volume) | 20 |
| Red copper (I) oxide ($Cu_2O$) | 1306 |
| Carboxymethylcellulose | 2 |

[1]The tannin has 8% humidity

The red-coloured homogeneous suspension thus obtained was then transferred to a tank and stored at room temperature.

The invention claimed is:

1. An agricultural aqueous suspension comprising, in weight percent with respect to the total weight of the suspension, at least 10% of at least one metal in the form of salt and/or oxide and/or hydroxide, at least 5.0% of at least one polyphenol and from 0.05 to 10% of at least one dispersing agent;
   wherein the at least one polyphenol is tannins; and
   wherein the aqueous suspension is a fertilizer and/or a phytoprotective agent.

2. The suspension according to claim 1, wherein said at least one metal is chosen from copper, zinc, manganese, cobalt, iron and molybdenum.

3. The suspension according to claim 1, wherein said salt is chosen from carbonate, nitrate, chloride and sulphate.

4. The suspension according to claim 1, wherein, in weight percent with respect to the total weight of the suspension, said at least one metal is present in said suspension in a concentration ranging from 10 to 60%.

5. The suspension according to claim 1, wherein, in weight percent with respect to the total weight of the suspension, said at least one polyphenol is present in the suspension in a concentration ranging from 5 to 20%.

6. The suspension according to claim 1, wherein said at least one dispersing agent is chosen from acrylic polymers, phosphatides, phosphoric esters and alkyl sulphonates.

7. The suspension according to claim 1, comprising at least one thickener, chosen from carboxymethylcellulose, xanthan gum, guar gum, agar agar, acrylic copolymers, alginates, natural gum, and polyphosphates.

8. A method comprising using the aqueous suspension according to claim 1 as a fertilizer and/or a phytoprotective agent of a plant by way of application to said plant of said aqueous suspension.

9. The method according to claim 8, comprising the application of a quantity of said suspension, in dry weight per hectar of field, ranging from 50 to 2,250 g/ha.

10. The method according to claim 8, wherein said plant is chosen from the families of Fabaceae, Rosaceae, Musaceae, Poaceae, Solanaceae, Ericaceae, Brassicaceae, Cucurbitaceae, Apiaceae, Sterculiaceae, Arecaceae, Rubiaceae, Malvaceae, Rutaceae, Amaryllidaceae, Asteraceae, Anacardiaceae, Oleaceae, Vitaceae, Bromeliaceae, Amaranthaceae.

11. The method according to claim 8, wherein said using is using as a fungicide, bacteriostatic agent, insecticide, nematostatic agent and/or slug killer.

12. The suspension according to claim 1, wherein said at least one metal is copper.

13. The suspension according to claim 1, wherein said salt is carbonate.

14. The suspension according to claim 1, wherein, in weight percent with respect to the total weight of the suspension, said at least one metal is present in said suspension in a concentration ranging from 18 to 25%.

15. The suspension according to claim 1, wherein, in weight percent with respect to the total weight of the suspension, said at least one polyphenol is present in the suspension in a concentration ranging from 8 to 10%.

16. The suspension according to claim 1, wherein the metal is in the form of copper carbonate and copper oxide.

17. The suspension according to claim 1, wherein the metal is in the form of copper carbonate, copper oxide and copper hydroxide.

18. The suspension according to claim 1, comprising at least one thickener chosen from carboxymethylcellulose and/or xanthan gum.

19. A process for the production of an agricultural aqueous suspension comprising, in weight percent with respect to the total weight of the suspension, at least 10% of at least one metal in the form of salt and/or oxide and/or hydroxide, at least 5.0% of at least one polyphenol and from 0.05 to 10% of at least one dispersing agent, comprising a step of mixing said at least one metal, said at least one polyphenol, said at least one dispersing agent, and any further components in water; wherein the at least one polyphenol is tannins; and wherein the aqueous suspension is a fertilizer and/or a phytoprotective agent.

20. The process according to claim 19, wherein said mixing step is preceded by a step of reduction of the particle size distribution of said at least one metal, said at least one polyphenol and/or any solid components among said further components of the suspension.

21. The process according to claim 20, wherein said step of reduction of the particle size distribution is a micronization step.

* * * * *